United States Patent [19]

Peterson

[11] Patent Number: 4,744,259

[45] Date of Patent: May 17, 1988

[54] APPARATUS FOR PRODUCING A DIRECTIONAL UNIT FORCE

[76] Inventor: Oscar F. A. Peterson, 3125 Portage Avenue, Winnipeg, Manitoba, Canada, R3K 0W4

[21] Appl. No.: 58,864

[22] Filed: Jun. 5, 1987

[51] Int. Cl.[4] .......................... F03H 5/00; F16H 33/20
[52] U.S. Cl. .................................................. 74/84 S
[58] Field of Search ................ 74/84 R, 84 S; 180/7.1

[56] References Cited

U.S. PATENT DOCUMENTS 3,807,244  4/1974  Estrade .
3,998,107  12/1976  Cuff .
4,095,460  6/1978  Cuff .

FOREIGN PATENT DOCUMENTS 0128008  12/1984  European Pat. Off. .

Primary Examiner—Lawrence J. Staab
Attorney, Agent, or Firm—Adrian D. Battison; Stanley G. Ade; Murray E. Thrift

[57] ABSTRACT

A device for generating a unidirectional force comprises a rotary body carrying around its periphery a plurality of pivotal pendulum masses mounted on shafts parallel to the axis of rotation of the rotary body. As the body rotates the masses are moved inwardly to a retracted position by a cam surface and then are free to swing outwardly at an abrupt end of the cam surface. Each pendulum mass is associated with a leaf spring which rotates with the rotatable body and carries a roller on an outer end thereof for engaging a side of the pendulum mass so as to bias the pendulum mass back to the retracted position. The spring thus acts to control the flinging movement of the pendulums as they move outwardly and to gradually return them to the retracted position for reengagement with the cam surface.

16 Claims, 3 Drawing Sheets

APPARATUS FOR PRODUCING A DIRECTIONAL UNIT FORCE

BACKGROUND OF THE INVENTION

This invention relates to an apparatus for producing an unidirectional force of a type comprising a rotary body on which are mounted masses which can move relative to the body so as to change the position of their centre of gravity relative to an axis of rotation of the rotary body with the movement of the centres of gravity being arranged to cause a unidirectional force in a direction transverse to the axis of rotation.

Various designs for devices of this type have been proposed and examples are shown in U.S. Pat. Nos. 3,807,244 (Estrade), and 4,095,460 (Cuff) and also in European patent application publication No. 128008 (Thornson). The designs however proposed in these arrangements have a number of disadvantage including the complexity of the design, the necessity for accurate balancing, the use of various gear drive arrangements, and in some cases the inability to control the direction of force.

It is one object of the present invention, therefore, to provide a device of this general type which has a simple and effective design enabling generation of a unidirectional force. According to the invention, therefore, there is provided an apparatus for producing a unidirectional force comprising a body symetrical about a central axis thereof, means mounting the body for rotation about said central axis, drive means for driving said rotation of said body, a plurality of pendulum masses, means mounting each mass on said body of said central axes with said pivot axis spaced angularly around said central axis such that said body and said masses can rotate in a balanced condition around said central axis with said masses tending to move to an extended position in which a centre of gravity of each mass lies on a line joining said central axis and said respective pivot axis, a cam surface arranged to extend around said central axis, means on each of said masses for engaging on and running around said cam surface such that when engaged therewith each mass is pivoted out of said extended position to a retracted position in which said centre of gravity is moved radially inwardly, said cam surface having an angular extent less than 360° so as to provide an angular part of the rotation of the body in which the masses are free to move toward the extended position, and spring means for engaging each of said masses as it moves to the extended position and arranged to provide a spring restraining bias force acting to return said mass to said retracted position.

Preferably the device uses a direct drive motor acting upon the rotary body so as to avoid the necessity for gears and other drive interconnections which add to complexity and cost.

Preferably the device is mounted in a housing which can be adjusted in two directions in order to adjust the direction of the unidirectional force.

Preferably the spring means controlling the movement of the pendulum masses comprises a plurality of separate leaf springs each associated with a respective one of the pendulum masses for engaging that mass as it moves to the extended position and for providing a biasing force tending to return it to the retracted position.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
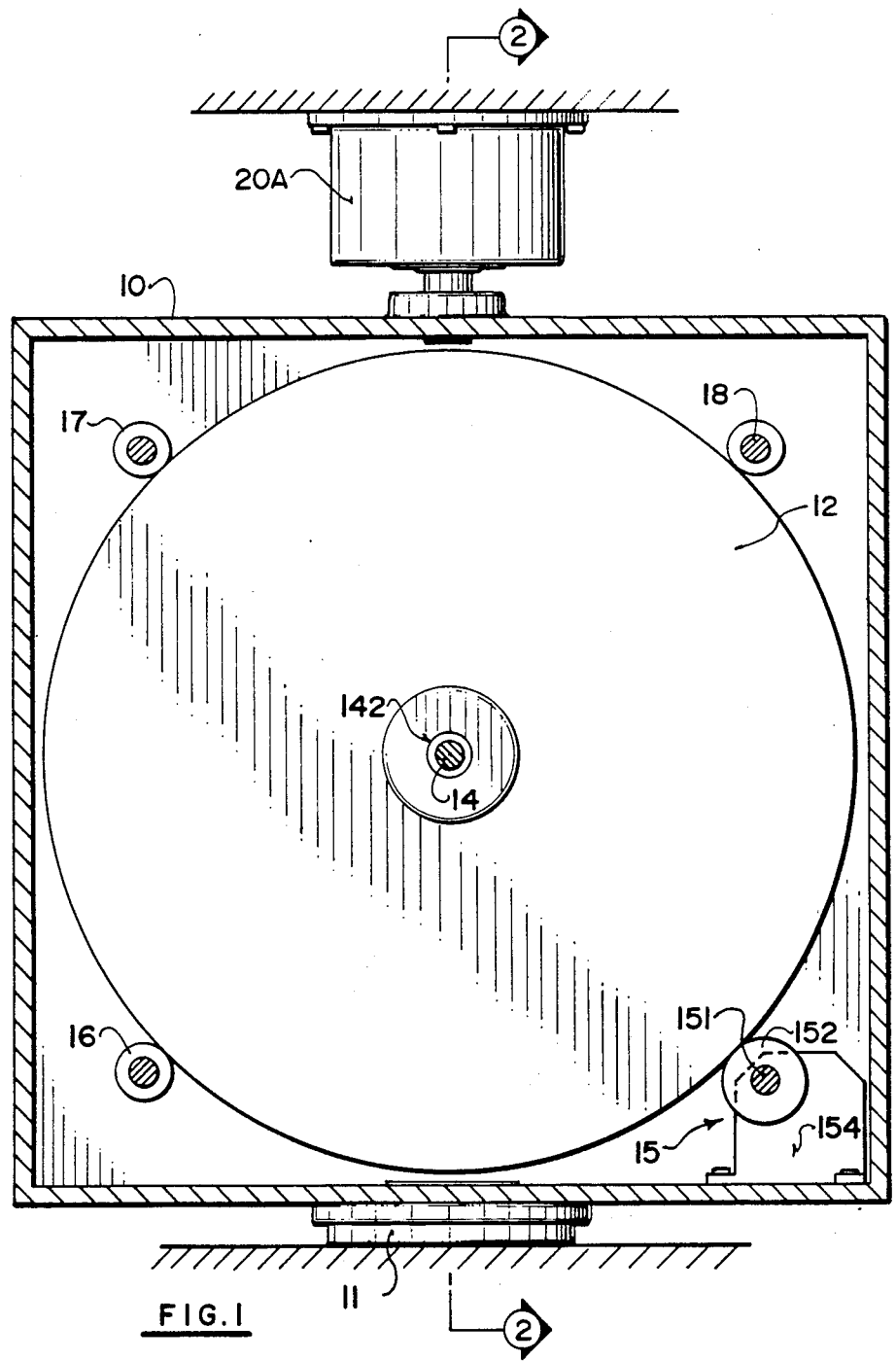
FIG. 1 is a side elevational view of a device according to the present invention
Figure 2:
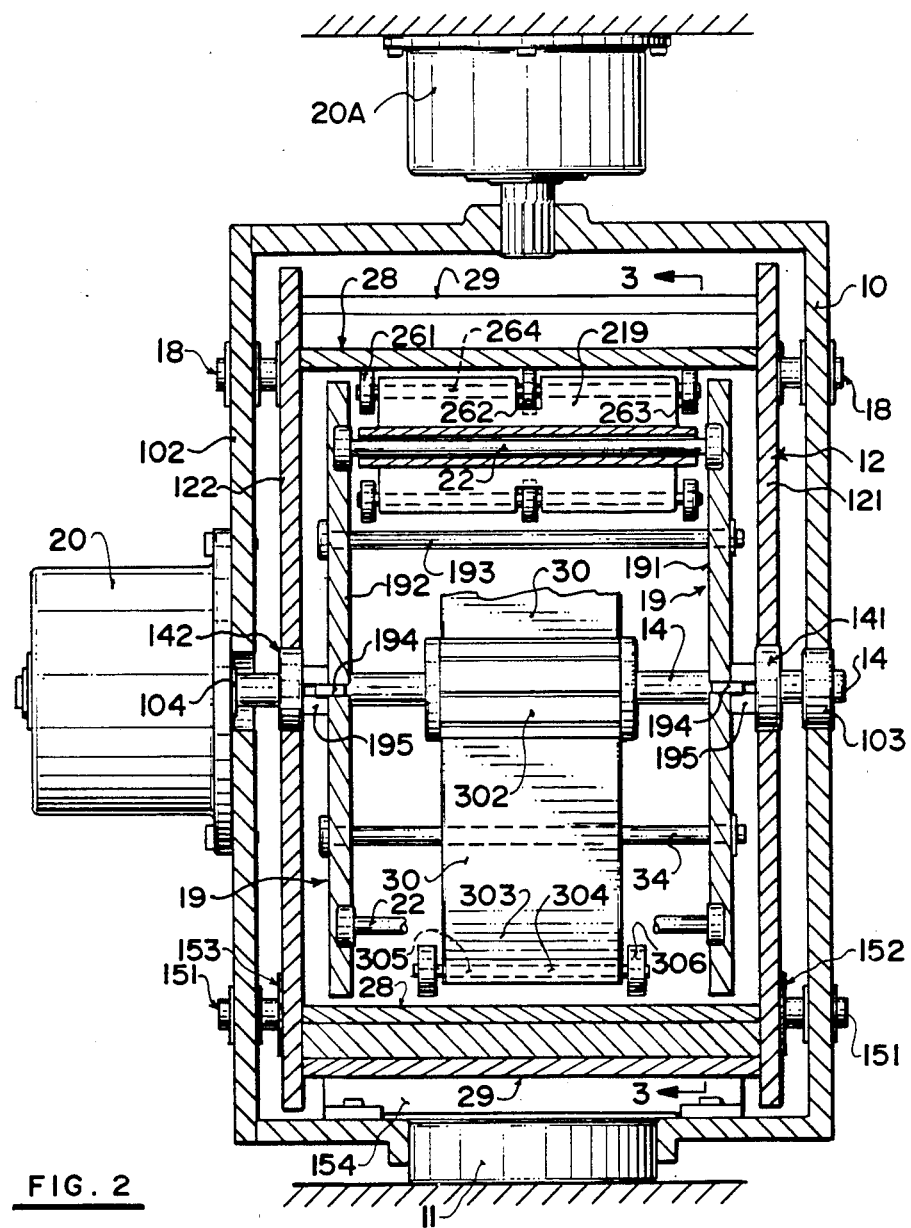
FIG. 2 is a cross sectional view along the lines 2/2 of FIG. 1

Referring firstly to FIGS. 1 and 2, the device comprises an outer housing 10 mounted in bearings 11 at the lower end and in a motor 20A at the upper end thereof for rotation of the housing about a vertical axis defined through the bearings. The outer housing 10 is generally rectangular in side elevation and includes an inner housing 12 which is circular in side elevation. Referring to FIG. 2 it will be seen that the housing 10 includes a front face 101 and a rear face 102 which are interconnected by a top, bottom and sides. Similarly the inner housing 12 includes a front face 121 and a rear face 122 again connected together for common movement.

The inner housing 12 is mounted within the outer housing 10 and is rotatable therein about an axis at right angles to the front face 121 and central of the front face. The axis is defined by a shaft 14 on which the front and rear faces are mounted on bearings 141 and 142. The shaft is free to rotate relative to the outer housing 10 in bearings 103 and 104. The inner housing 12 can be driven in rotation around the shaft relative to the outer housing by a drive arrangement generally indicated at 15 including a shaft 151 and drive sprockets 152, 153 which engage suitably on an outer edge of the front and rear faces of the housing 12. Drive to the shaft 151 is provided by a control unit indicated at 154 which is shown only schematically since its detail will be apparent to one skilled in the art. The bearings for the inner housing in its rotation relative to the outer housing are provided by three further shafts and support discs indicated generally at 16, 17 and 18 all of which are similar to the drive system 152 but are idling rather driven.

Within the inner housing 12 is mounted a rotatable body 19 which is of disc shape and is defined by a circular front face 191 and a circular rear face 192 which are interconnected by transverse pins 193. The front and rear faces 191, 192 of the rotatable body are keyed to the shaft 14 by keys 194 and are spaced from the inner surfaces of the adjacent inner housing wall by spacer 195. The shaft 14 is driven by a variable speed drive motor which is mounted on the outer surface of the rear face 102 of the outer housing as indicated schematically at 20. Drive motor drives directly the shaft 14 without the necessity for gears or other interconnecting drive couplings. A supplementary back-up motor can be provided on the opposed face.

Figure 3:
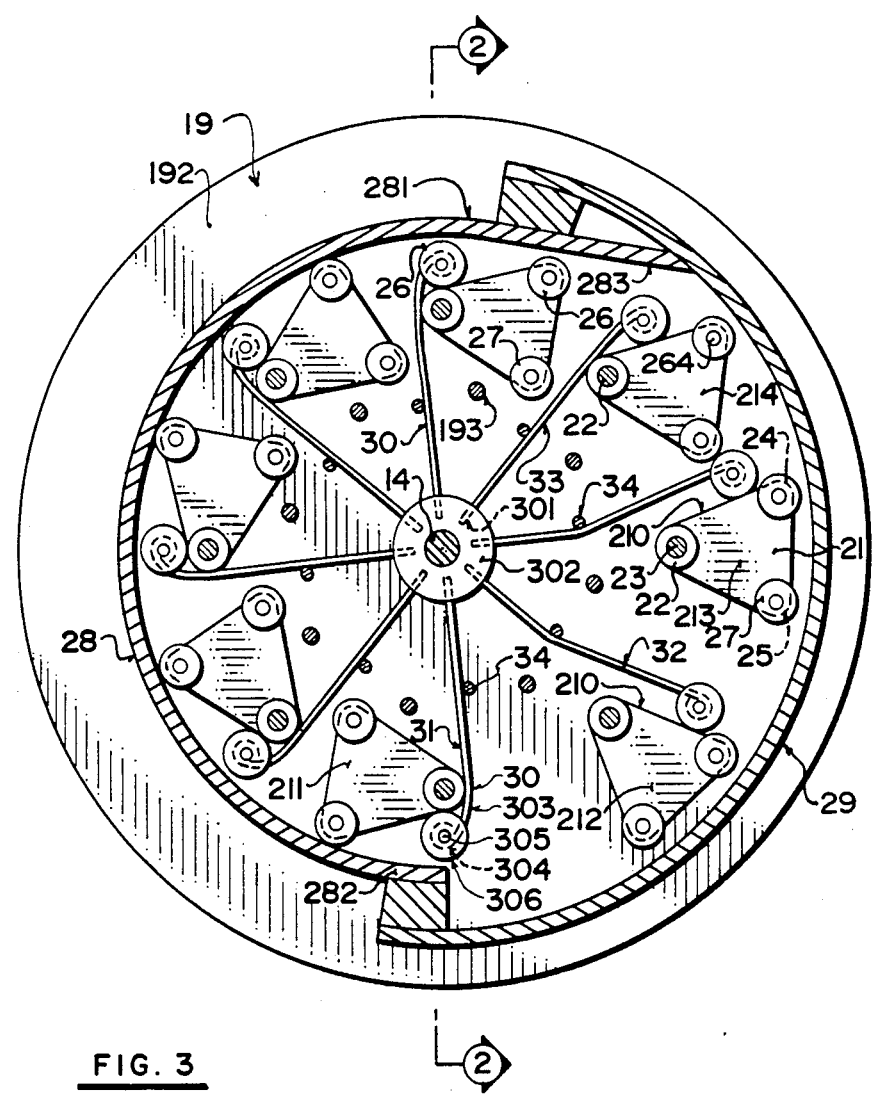
FIG. 3 is a cross sectional view along the lines 3/3 of FIG. 2.

On the rotatable body is mounted a plurality of pendulum masses 21 which are shown in more detail in FIG. 3 and only one of which is fully visible in Figure 2. In the arrangement shown in FIG. 3 there are eight such pendulum masses arranged equidistantly angularly spaced around the body and lying on the same radius relative to the shaft 14 more or less masses can be used. Thus each of the pendulum masses is mounted for rotational movement around a respective shaft 22 which defines a pivot axis thereon. Each of the masses is generally triangular in shape from an inner apex 23 to a pair of outer apexes 24 and 25 which are positioned symetrically relative to the inner apex 23. The corners of the triangular body may be rounded as necessary. The shaft 22 is positioned effectively as close as possible to the inner apex 23 so that substantially the whole of the weight of the mass lies on one side of the shaft 22. It would be appreciated from FIG. 2 that while the masses are triangular in cross section they are elongate so as to fill the space between the discs 191, 192.

Each of the masses carries a roller arrangement 26, 27 at each of the apexes 24 and 25 defining roller wheels which extend outwardly beyond the apex for engaging an adjacent body. As shown in FIG. 2, the roller wheels 26 do not extend along the full length of the mass but are constituted by separate wheels 261, 262, 263 arranged at each end of the mass and centrally of the mass and carried on a common shaft 264.

Outside of the masses, fixed on the inner housing 12 is provided a cam surface 28. The cam surface extends from an inlet end at 281 to an outlet end 282 between which it has an angular extent of the order of 180Σ and a constant radial dimension from the shaft 14. That dimension is chosen such that it causes each of the masses as they pass around the cam surface 28 to be pivoted inwardly so that the roller assembly 26 runs on the inner surface of the cam to hold the mass in a retracted position in which its centre of gravity is moved radially inwardly from the expanded position in which it would normally lie on a line joining the shaft 14 and the shaft 22. The cam surface at the end 282 terminates abruptly and a further plate 29 is provided radially outwardly of the cam surface 28 so as to join the front and rear face of the inner housing 12. Over the area bounded by the plate 29 the masses are free to swing outwardly to their normal extended position.

Each mass is associated with a respective one of a plurality of leaf springs 30 which are mounted so as to extend radially from the shaft 14 in angularly spaced position and arranged with each intermediate its respective pendulum mass and the next adjacent pendulum mass. Each leaf spring comprises a plate member which has an inner end 301 fixedly carried on a hub 302 surrounding the shaft 14 so that the spring is maintained at a predetermined angular position. An inner part of the spring extends radially outwardly in a flat plane and an outer end indicated at 303 is cranked or curved around in a trailing direction and then forms a loop 304 at an outer most end thereof for receiving a shaft 305 carrying roller wheels 306. The roller wheels 306 are arranged to engage a side face 210 of the respective pendulum mass.

The natural relaxed position of the leaf spring 30 is indicated at 31 with further distorted positions of the leaf springs being indicated at 32 and 33. Thus in the natural position indicated at 31 with the respective pendulum mass indicated at 211 in the retracted position, the leaf spring cranks around the inner apex of that pendulum mass for the roller wheels 306 to engage the side 210 of that mass. As the pendulum mass is released from its engagement with the cam surface 28 at the end 282, it moves rapidly toward the extended position indicated at 212. As it moves toward this position the leaf spring 30 is distorted so as to straighten the curve portion 303 and to curve the straight portion in an anti-clockwise direction as the pendulum masses move in that anti-clockwise direction. The leaf spring thus provides a resilient biasing force tending to resist the movement of the pendulum mass past its extended position. A stop member 34 is associated with each of the leaf springs and acts to hold an inner end of the leaf spring at the fixed angular position so that any distortion of the leaf spring occurs preferentially around the stop member 34. This is indicated particularly at the position of the leaf spring indicated at 32 and thus the biasing force rapidly increases as the pendulum mass goes beyond the extended position shown at 212.

The balance between the spring return force generated by the leaf spring and the momentum of the respective pendulum mass is arranged so that the pendulum masses move to the extended position as indicated at 212 and 213 and then the return spring force tends to overcome the reduced momentum of the pendulum mass to cause it to move back toward the retracted position as indicated at 214. This movement toward the retracted position occurs before the respective pendulum mass reaches the inlet end 281 of the cam surface 28. This movement is also assisted by engagement of each spring in turn with the next adjacent forward one of the pendulums so that each pendulum as it sweeps back to its retracted position engages the next backing spring and applies force to biass the pendulum associated with that spring back to the retracted position. To assist in moving the respective pendulum mass into its retracted position, a ramp portion 283 is provided between the outer plate 29 and inclined inwardly to the radius of the cam surface 28 so that the roller assembly 26 if engaging that ramp tends to move the respective pendulum mass in an inward direction to the retracted position.

A unidirectional force is thus generated by the release of the masses from their engagement with the cam surface and the flinging action thus arising in the area of the positions 212 and 213. In FIG. 3, therefore, a force is generated in a generally vertically upward direction and then the flung mass is smoothly and without undue vibration moved backwardly into its retracted position for a further stroke in each cycle of rotation. The use of a plurality of such masses around the periphery of the body causes a relatively smooth force in the required direction.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for producing a directional unit force comprising a body symmetrical about a central axis thereof, means mounting the body for rotation about said central axis, drive means for driving said rotation of said body, a plurality of pendulum masses, means mounting each mass on said body for pivotal movement about a respective pivot axis spaced radially of said central axis with said pivot axes spaced angularly around said central axis such that said body and said masses can rotate in a balanced condition around said central axis with said masses tending to move to an extended position in which a centre of gravity of each mass lies on a line joining said central axis and said respective pivot axis, a cam surface arranged to extend around said central axis, means on each of said masses for engaging on and running around said cam surface such that when engaged therewith each mass is pivoted out of said extended position to a retracted position in which said centre of gravity is moved regularly inwardly, said cam surface having an angular extent less than 360° so as to provide an angular part of the rotation of the body in which the masses are free to move toward the extended position, and spring means for engaging each of said masses as it moves to the extended position and arranged to provide a spring restraining bias force acting to return said mass to said retracted position.

2. The invention according to claim 1 including a plurality of separate spring means each associated with and rotatable with a respective one of said pendulum masses and arranged to engage said respective pendulum mass.

3. The invention according to claim 2 wherein each of said spring means comprises a leaf spring flexible about a direction parallel to the central axis.

4. The invention according to claim 2 wherein each of said spring means carries a roller member for engaging a side of the respective pendulum mass.

5. The invention according to claim 4 wherein said spring means is arranged relative to said pendulum mass such that said roller lies against said side of said pendulum mass in said retracted position and rolls along said side as said mass moves towards said extended position.

6. The invention according to claim 5 wherein said spring means includes a crank portion arranged to wrap said roller around said pivot axis and to engage said side of said pendulum mass remote from said central axis.

7. The invention according to claim 1 wherein said pendulum mass includes roller means for engaging said cam surface.

8. The invention according to claim 1 wherein said cam surface is of substantially constant radial distance from said central axis and includes a ramp portion extending from said angular part of the rotation of the body over a reducing radial distance from said central axis to said constant radial distance.

9. The invention according to claim 1 wherein each of said pendulum masses is substantially triangular in shape with said pivot axis arranged at one apex thereof.

10. The invention according to claim 2 wherein each of said masses includes a first member for engaging said cam surface and a second member for engaging a spring means of a next adjacent pendulum mass arranged so as to provide a spring restraining bias against movement of said pendulum mass inwardly beyond a predetermined point.

11. The invention according to claim 1 wherein said cam surface terminates abruptly at said angular part so as to allow said pendulum masses to fling outwardly at an end of said cam surface.

12. The invention according to claim 1 wherein said cam surface has an angular extent of the order of 180° of arc.

13. The invention according to claim 3 wherein said body carries a plurality of stop members each for engaging a respective one of said leaf springs to prevent flexing movement thereof beyond a predetermined position.

14. The invention according to claim 1 including a housing and means mounting said body and said cam surface therein, said mounting means providing adjustment movement of said cam surface relative to said central axis in a direction around said central axis and in a direction at right angles thereto so as to adjust the direction of force generated by said pendulum masses.

15. The invention according to claim 1 wherein each of said pendulum masses moves from said retracted position to said extended position through an angle of the order of 90° about said respective pivot axis.

16. The invention according to claim 1 wherein said body comprises a pair of parallel discs interconnected by a plurality of shafts arranged angularly around said central axis and parallel to the central axis, said pendulum masses being mounted upon said shafts between said discs.

* * * * *